United States Patent [19]

Van Houten et al.

[11] 3,906,736
[45] Sept. 23, 1975

[54] SHOCK ABSORBER APPARATUS FOR SUBSEA WELLHEAD HANDLING SYSTEM AND METHOD FOR USING SAME

[75] Inventors: Roland W. Van Houten, Palo Alto, Calif.; John W. Engstrom, Kennewick, Wash.

[73] Assignee: Subsea Equipment Associates Limited, Hamilton, Bermuda

[22] Filed: May 8, 1974

[21] Appl. No.: 467,877

[52] U.S. Cl. .......................... 61/69; 61/46.5; 166/.5
[51] Int. Cl.² ......................................... B63C 11/34
[58] Field of Search ........ 61/69, 69 A, 46.5; 166/.5; 244/138 R; 267/1

[56] References Cited
UNITED STATES PATENTS

| | | | |
|---|---|---|---|
| 2,712,913 | 7/1955 | Stanley | 244/138 R |
| 2,961,204 | 11/1960 | Rayfield et al. | 244/138 R |
| 3,640,079 | 2/1972 | Le Therisien et al. | 61/69 A |
| 3,699,689 | 10/1972 | Haynes | 61/69 R |
| 3,744,561 | 7/1973 | Shatto, Jr. et al. | 166/.5 |

Primary Examiner—Jacob Shapiro
Attorney, Agent, or Firm—Ernest F. Marmorek

[57] ABSTRACT

A shock absorber assembly for a subsea wellhead handling system is disclosed. The shock absorber system comprises a plurality of angularly spaced apart, elongated shock absorbing units each of which has one end secured about the periphery of a handling tool. The other end of each of the shock absorbing units is secured to an annular member that defines a landing ring. Each shock absorbing unit is mounted in a column of the handling tool. A normally extended energy absorber within each shock absorbing unit contacts a push rod which is guided inside a guide sleeve. The bottom of each push rod is attached to a clevis assembly. The lower portion of the clevis assembly is secured to the landing ring and contains an elongated hole in which a clevis pin is positioned. A spherical ball bearing, which is part of each clevis assembly allows freedom of motion in all directions at the clevis pin. The method comprising the present invention resides in the sequential, axial displacement of the several shock absorber units after the landing ring makes the initial point contact with the wellhead landing surface. The several shock absorbers successively take up the load while permitting the landing ring to rotate about the axis of the clevis pin adjacent which contact was first made with the wellhead landing surface. Eventually all shock absorber units take up the full load when the landing ring has made full contact with the wellhead landing surface so that the impact load and bending moments during landing of the handling tool on the subsea wellhead are kept within allowable limits.

6 Claims, 9 Drawing Figures

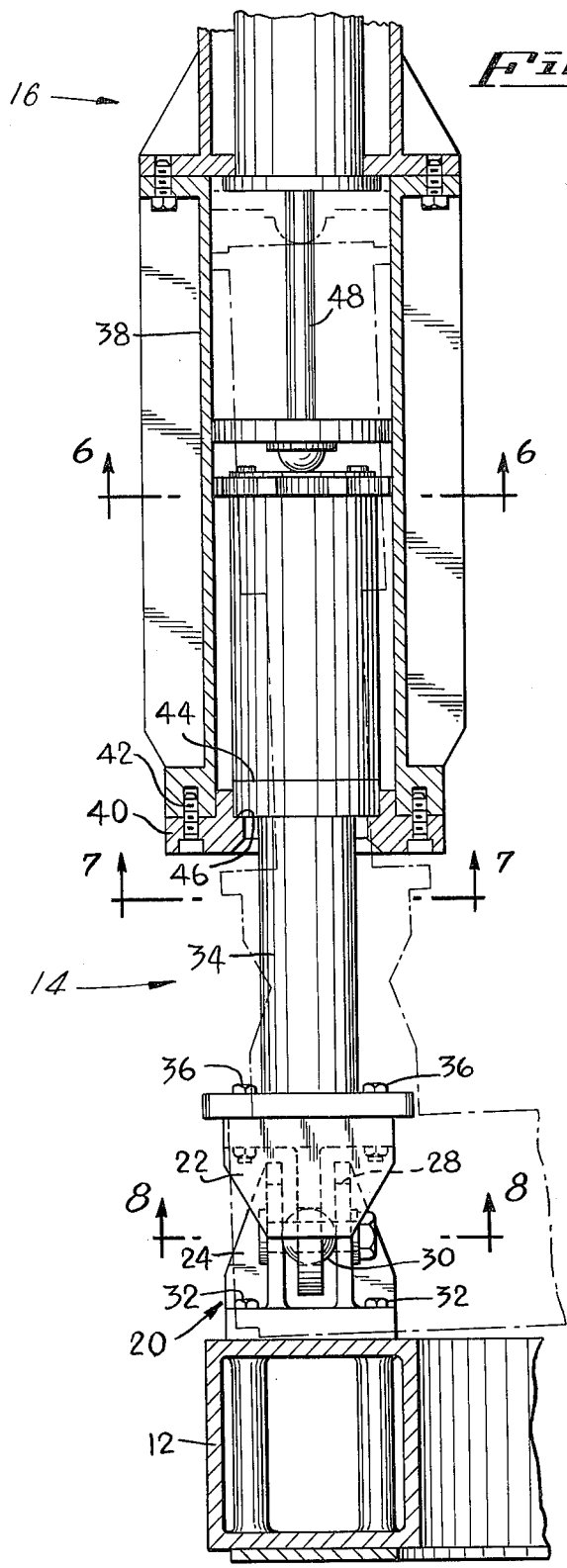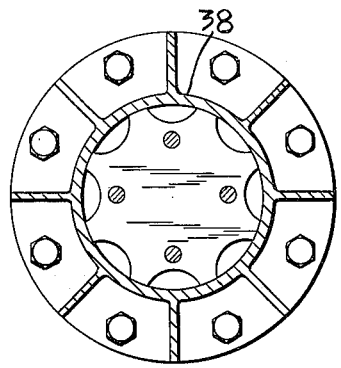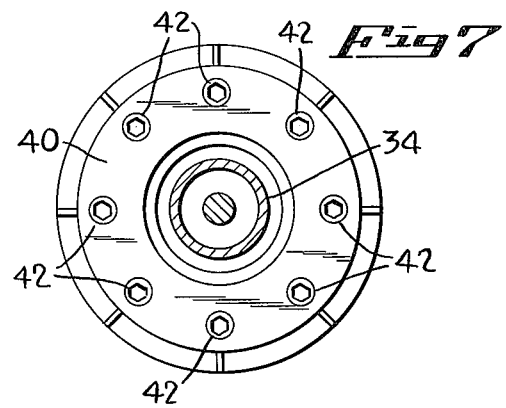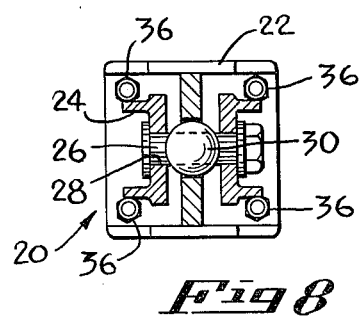

SHOCK ABSORBER APPARATUS FOR SUBSEA WELLHEAD HANDLING SYSTEM AND METHOD FOR USING SAME

BACKGROUND OF THE INVENTION

1. Field of the Invention

This invention relates generally to oil well structure and more particularly to a shock absorber system which allows eccentric landing of heavy masses on a subsea oil wellhead without exceeding the allowable load limits of the wellhead.

2. Description of the Prior Art

In the art of recovering oil from a subterraneous formation, geophysical explorations are accomplished by various methods. One such method is cable tool drilling in which a heavy drilling bit, which may be many feet in length, is first moved upwardly and then allowed to drop so as to produce the hole by displacement. The cuttings are bailed out after periodical sinking of the hole. Another method for drilling wells is called the "rotary" system in which an enlarged bit at the end of a drill stem or drill pipe is rotated while it is being let down in the hole to be formed. A drilling fluid is then pumped down the drill pipe, passed through holes or eyes in the bit and rises outside of the drill pipe of the surface carrying the cuttings with it. These cuttings are then separated from the "mud" or fluid by gravity separation along a settling ditch or passed over a screen or both with the drilling fluid then proceeding to a sump for recirculation.

In the cable tool system described hereinabove, drilling fluid may also be used. The drilling fluid performs a number of functions such as carrying the cutting to the surface as described above and also to line the bore hole by a filtering action. Where an aqueous drilling fluid is employed, various solids may also be used such as clay. In order to impart specific gravity to the drilling fluid, a heavy material such as barytes may be employed and to control the viscosity polyphosphates may be used.

During the drilling, the bore hole is cased, usually at various stages in sinking the well. The casing operation is performed by a steel casing that is let down into the hole and which is cemented in place to shut off water formations and prevent caving. As is well known there may be a number of "strings" of casings in a well.

To complete the well for production, the drilling fluid is bailed out of the well leaving a coating of clay on the bore walls which must be removed at the producing formation. For this purpose the well may be "swabbed" by letting down a swabbing tool which will take off the drilling fluid solid from the bore hole at the producing formation. Another method commonly used is to employ acid together with a corrosion inhibitor. Still another method used is to apply shots of nitroglycerine. The producing formation may then be expanded.

The bottom of the hole may be provided with a "gravel pack" and this may be partially done before the screen leading to the tubing is let down into the well. This tubing is smaller than the well bore including the casing and where the pressure is not sufficient to cause the well to flow to the top, a pump cylinder and piston are provided near the bottom of the well and below that is a screen around which gravel may be packed. The piston is provided with a pump rod which extends to the top of the well and is connected to suitable pumping mechanisms. In some situations gas and air lifts may be employed. A flow line extends from a tubing to the point of storage.

As will be explained more fully hereinafter, the present invention is concerned with the various methods used for promoting the flow of oil into a well or with the means employed for removing oil from the well only to the extent that the present invention relates generally to oil wells. More particularly, the present invention is directed towards improved means which allow for the eccentric landing of heavy masses on a subsea oil wellhead without exceeding the allowable load limits of the wellhead. Prior art structure in the general area to which the present invention is directed utilized guidelines for aligning the handling equipment with the wellhead and for guiding the loads so that they impacted axially on the wellhead. The use of guidelines, while having some degree of proficiency, has not been found to be fully acceptable, particularly on subsea oil wellheads where swift water currents are present and where stability or, more particularly the lack of stability, creates serious problems in handling the heavy masses which were described hereinabove.

SUMMARY OF THE INVENTION

As will be described more fully hereinafter, the dependence upon the prior art guidelines is eliminated by the present invention which, instead, uses dynamic positioning techniques to accommodate the eccentric landing of heavy masses on the subsea oil wellhead. The structure of the shock absorber system and the method for using same which comprises the present invention permits the landing of heavy masses on the subsea oil wellhead without exceeding the allowable load limits of the wellhead and thereby reduces the risk of damage to the wellhead.

In its broadest aspect, the shock absorber system of this invention comprises an annular landing ring and a plurality of angularly spaced apart, elongated shock absorber units. One end of each of the shock absorbing units is pivotally mounted, by means of a clevis assembly and a spherical bearing, to the landing ring assembly. The other end of each of the shock absorbing units is mounted in an equally spaced arrangement about the periphery of the handling tool. The shock absorbing units each comprise a normally extended energy absorber which contacts a push rod that is guided within a guide sleeve. It is the bottom of the push rod that is attached to the clevis assembly.

According to the method of the present invention, when the handling tool approaches the wellhead at an angle, the landing ring will make a point contact with the wellhead landing surface. The landing ring then rotates about the plane coincidental with the axis of the clevis pin of the outermost shock absorber unit until the free or lost motion in the clevis pin slot adjacent to the point of contact and remote from the outermost shock absorber unit is taken up. The shock absorber unit at the point of contact starts to take up the load while the landing ring continues to rotate about the axis of the clevis pin of the outermost shock absorber unit so that the handling tool will, immediately upon contact with the landing ring, start to rotate to an upright position. As the shock absorber unit adjacent the point of contact deflects axially and the landing ring rotates about the shock absorber unit remote from the point of contact, the free or lost motion in the clevis assemblies of the intermediate shock absorber units are taken up and the adjacent or intermediate shock absorber units are thereby loaded. When the landing ring has made full contact with the wellhead landing surface, all of the shock absorber units take up the load and the center of application of the impact load will be located at the center of the wellhead.

Thus by using the structure and method of the present invention, that is by using the energy absorbers to be described more fully hereinafter and by controlling the length of free motion in the clevis assemblies thereof, the impact load and bending moments that occur during landing of the handling tool on the subsea wellhead are kept within allowable limits. More particularly, and as will be described more fully hereinafter, the structure of the shock absorbing units comprising this invention is arranged so that rotational freedom of motion exists between the guide sleeve and the push rod during deflection of any particular shock absorber unit. However, when the energy absorber is fully extended, the guide sleeve and the push rod are rigidly engaged.

Accordingly, it is an important object of the present invention to provide an improved shock absorber system for eccentrically landing heavy masses on a subsea oil wellhead without exceeding the allowable load limits of the wellhead.

It is another important object of the present invention to provide an improved method for landing heavy masses on a subsea oil wellhead without exceeding the allowable load limits of the wellhead.

It is a further object of the present invention to provide a shock absorber system, as described above, wherein individual shock absorber units deflect successively when a heavy mass is eccentrically landed on a subsea oil wellhead.

A specific object of the present invention is to provide an improved shock absorber system, as described above, wherein each shock absorbing unit comprises a clevis assembly at the lower end thereof and secured to a landing ring such that a spherical ball bearing in the clevis assembly allows freedom of motion in all directions when a heavy mass is landed eccentrically on a subsea oil wellhead.

Still a further object of the present invention is to provide an improved shock absorber unit, as described above, wherein rotational freedom of motion exists during deflection of the shock absorber upon the eccentric landing of a heavy mass on a subsea oil wellhead.

Yet another object of the present invention is to provide an improved shock absorber system, as described above, wherein the components of each shock absorber unit is rigidly engaged when the shock absorber is fully extended.

It is an important object of the present invention to provide an improved shock absorber system, as described above, that uses dynamic positioning techniques for heavy masses that land eccentrically on a subsea oil wellhead, without exceeding the allowable load limits of the well head.

Further objects and advantages of the invention will be set forth in part in the following specification and, in part, will be obvious therefrom without being specifically referred to, the same being realized and attained as pointed out in the claims hereof.

With the above and other objects of the invention in view, the invention consists in novel methods, construction, arrangement and combination of various devices, elements and parts, as set forth in the claims hereof, one embodiment of the same being illustrated in the accompanying drawings, and described in the specification.

BRIEF DESCRIPTION OF THE DRAWING

For a fuller understanding of the nature and objects of the invention, reference should be had to the following detailed description, taken in connection with the accompanying drawings in which:

FIG. 5 is a fragmentary, sectional elevational view illustrating a typical shock absorbing unit comprising the present invention, a second position of a portion of which is shown in phantom outline;

FIG. 6 is a sectional plan view taken along line 6—6 of FIG. 5;

FIG. 7 is another sectional plan view taken along line 7—7 of FIG. 5;

FIG. 8 is still another sectional plan view taken along line 8—8 of FIG. 5; and

DESCRIPTION OF THE PREFERRED EMBODIMENT

Figure 1:
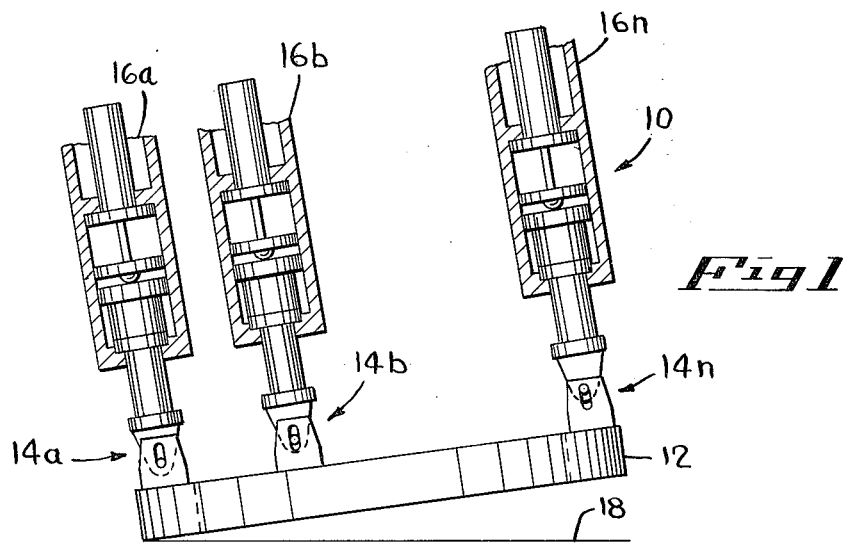
FIG. 1 is a fragmentary, schematic elevational view, partially in section, illustrating the first step in the sequence of operation of the method comprising this invention.
Figure 2:
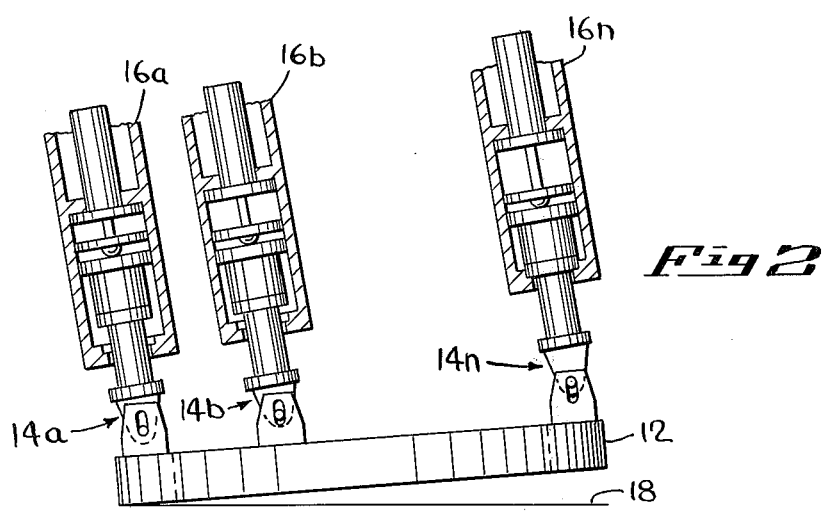
FIG. 2 is a fragmentary schematic elevational view similar to FIG. 1 illustrating another step in the sequence of operation of the method of this invention.
Figure 3:
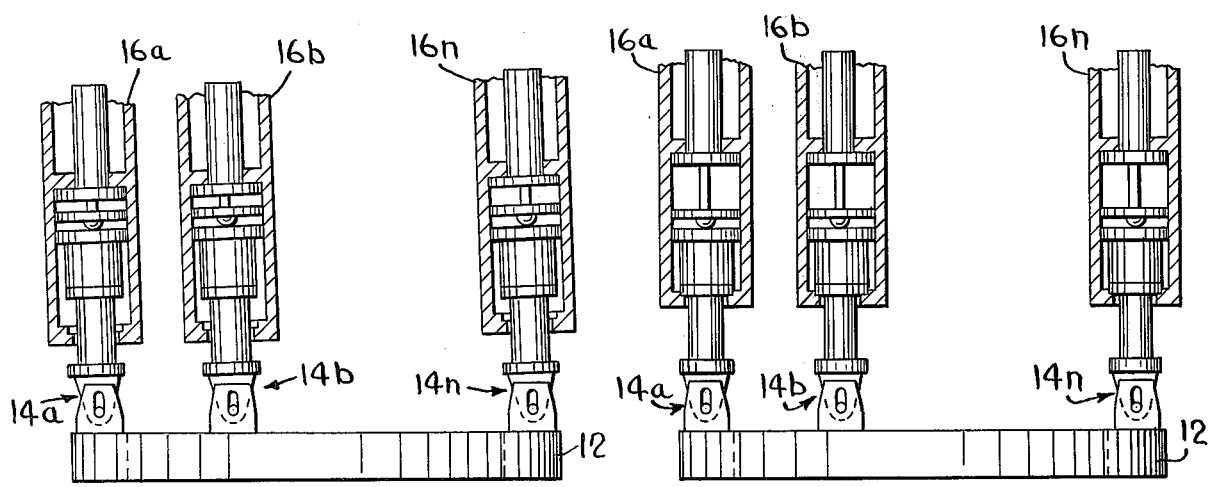
FIG. 3 is another fragmentary schematic elevational view, similar to FIG. 1 and FIG. 2 illustrating still another step in the method of this invention.
Figure 4:
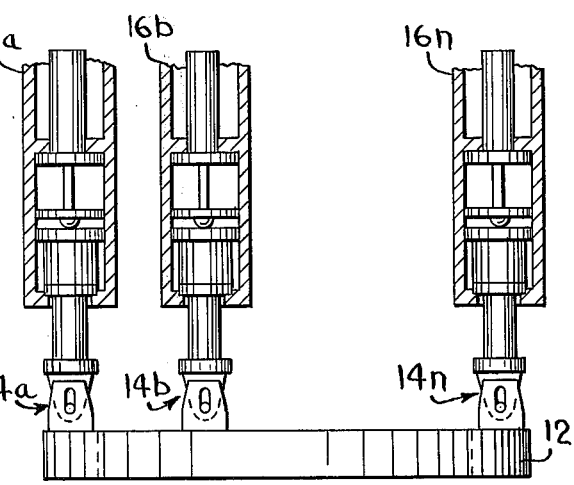
FIG. 4 is still another fragmentary schematic elevational view illustrating the final step in the method of this invention.
Figure 9:
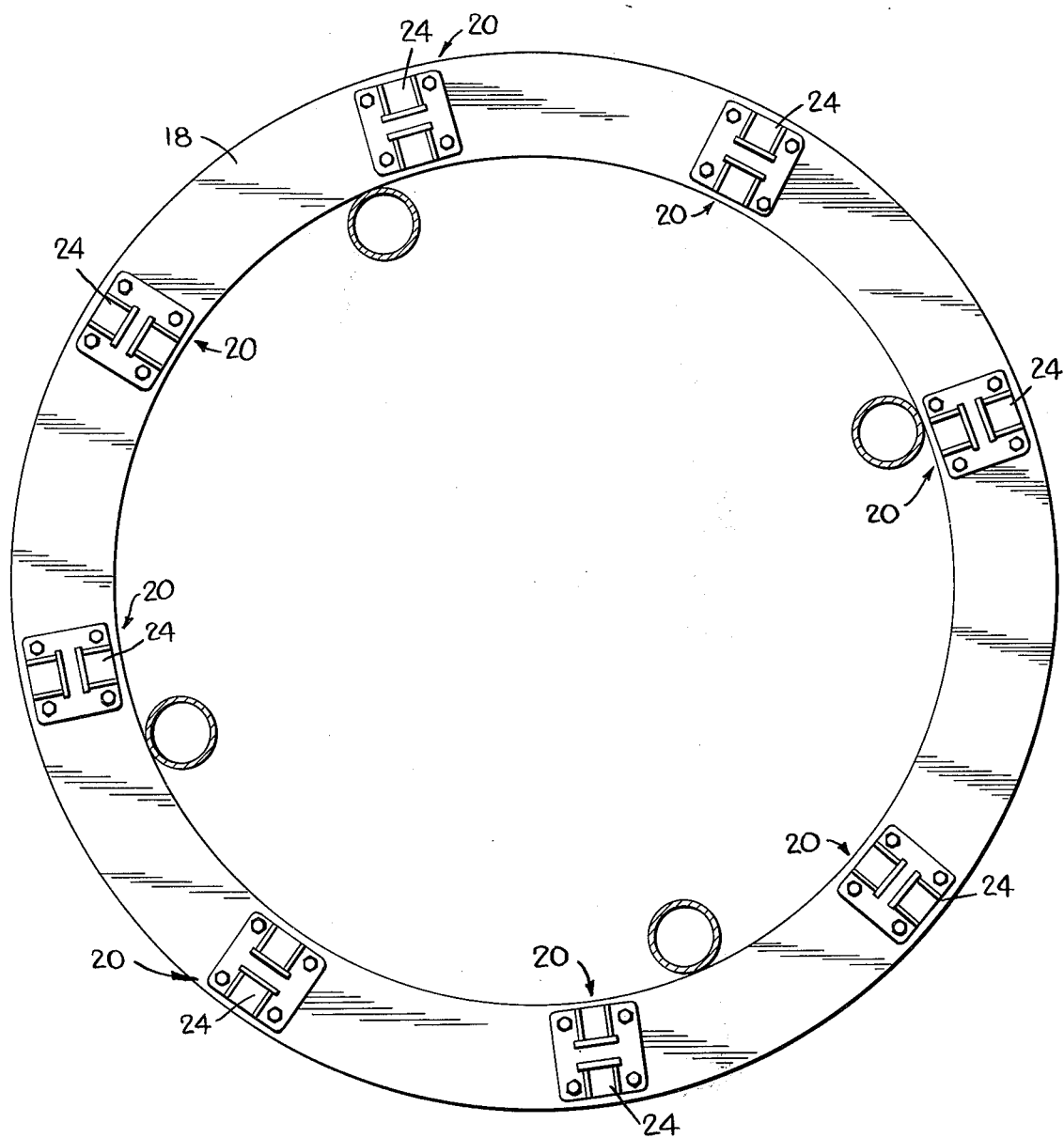
FIG. 9 is a fragmentary sectional plan view illustrating the angularly spaced apart relationship of the shock absorber units comprising this invention with respect to the landing ring thereof.

Referring now to FIGS. 1–4, it will be seen that the shock absorber system 10 comprising the present invention includes an annular landing ring 12 to which is secured the lower end of each of a plurality of elongated shock absorber units 14a, 14b, and 14n. While only three shock absorber units have been illustrated, it will be readily appreciated that any suitable and convenient number may be used. The handling tool is not shown except for the handling tool columns 16a, 16b, and 16n connected respectively to 14a, 14b, and 14n. As shown best in FIG. 5 for example, a handling tool designated by the reference character 16 is secured to the upper end of a shock absorber unit 14. Only a portion of the handling tool 16 is shown, namely part of a column. The handling tool columns 16a, 16b, and 16n are shown, in part, in FIGS. 1 to 4.

As the handling tool 16 approaches the wellhead landing surface, which is designated by the reference character 18, it frequently forms an angle therewith such as shown best in FIG. 1. The landing ring 12 will make a point contact with the wellhead landing surface 18. In a manner to be described more fully hereinafter, the landing ring 12 will rotate about a portion of the shock absorber unit 14n until the free motion in the shock absorber unit 14a is taken up. The shock absorber unit 14a then starts to take up the load while the landing ring 12 continues to rotate about the point in the shock absorber unit 14n and the handling tool 16 starts to rotate to an upright position. As the shock absorber unit 14a continues to deflect and as the landing ring 12 continues to rotate about the point within the shock absorber unit 14n, the free or lost motion of the intermediate shock absorber units 14 are taken up and the adjacent shock absorber units 14 are loaded. After the landing ring 12 has made full contact with the wellhead landing surface 18, all the shock absorber units 14 will have taken up the load. The center of application of the impact load will have moved rapidly and will be at the center of the wellhead. Thus, by using an appropriate energy absorber and by controlling the length of free or lost motion in the shock absorber units, the impact load and bending moments during the landing of the handling tool 16 on the subsea wellhead surface 18 are kept within allowable limits.

The structure of the present invention may best be appreciated by reference to FIGS. 5, 6, 7, 8, and 9. Each shock absorber unit 14 is comprised of a clevis assembly generally designated by the reference character 20. The clevis assembly 20 includes an upper clevis section 22 and a lower clevis section 24 which are joined to each other by a clevis pin 26 (FIG. 8) that rides in an appropriately sized and located slot 28 formed in the lower clevis member 24. Preferably, as shown in FIG. 8 for example, a spherical ball joint 30 is provided which allows freedom of motion in all directions about the axis of the clevis pin 26. The lower clevis 24 is suitably secured to the landing ring 12 by means of fasteners 32.

The upper clevis 22 is secured to the lower end of a push rod 34 by means of a plurality of fasteners 36. The push rod 34 is contained within a sleeve 38 and is retained by a ring 40 that is secured to the sleeve 38 by means of fasteners 42. A shoulder 44 formed on the push rod 34 engages a seat 46 formed integrally within the ring 40.

A normally extended energy absorber 48 is also mounted within the sleeve 38 and abuts the upper end of the push rod 34. As shown by the phantom outline in FIG. 5, the configuration of the shock absorber unit 14 is arranged so that rotational freedom of motion exists between the guide sleeve 38 and the push rod 34 during deflection of the energy absorber 48. When the energy absorber 48 is fully extended however, the guide sleeve 38 and the push rod 34 are rigidly engaged.

We wish it to be understood that we do not desire to be limited to the exact details of construction shown and described for obvious modifications will occur to a person skilled in the art.

Having thus described the invention, what we claim as new and desire to be secured by Letters Patent is as follows:

1. Apparatus for absorbing the shock encountered during the landing of a handling tool on a subsea wellhead, said apparatus comprising:
   a. landing ring means operative for supporting said handling tool and operable to be lowered onto the upper surface of the wellhead;
   b. a plurality of support means each having two ends and each having one end connected to said handling tool and operative for supporting said handling tool on the wellhead;
   c. a plurality of shock absorber means each connected to the other end of said support means and operative for absorbing a suddenly applied force; and
   d. a plurality of coupling means for coupling each of said shock absorber means to said landing ring means and operative to permit each of said shock absorber means to rotate.

2. The apparatus according to claim 1 wherein each said shock absorber means comprises an axially displaceable push rod connected to its coupling means and a generally coaxial energy absorber in engagement with its push rod, said energy absorber and its push rod being rigidly engaged when said landing ring means is in full contact with said wellhead, the longitudinal axis of said push rod being at an angle with respect to the longitudinal axis of its energy absorber when said landing ring means is in only partial engagement with said wellhead.

3. The apparatus according to claim 2 wherein each of said coupling means comprises a clevis assembly including a lower clevis section rigidly secured to said landing ring, an upper clevis section rigidly secured to its push rod and universal means pivotally joining said upper and said lower clevis sections.

4. The apparatus according to claim 3 wherein said universal means comprises a spherical member rotatably captured in said upper clevis section and a pin extending through said lower clevis section and said spherical member.

5. The apparatus according to claim 4 wherein said lower clevis section includes elongated slot means through which said pin extends.

6. The apparatus according to claim 1 wherein said coupling means are angularly spaced apart about said landing ring means.

* * * * *